United States Patent
Ahangarnejad

(10) Patent No.: US 12,515,733 B2
(45) Date of Patent: Jan. 6, 2026

(54) SYSTEMS AND METHODS FOR FRONT AXLE AND REAR AXLE LATERAL FORCE ESTIMATION

(71) Applicant: Steering Solutions IP Holding Corporation, Saginaw, MI (US)

(72) Inventor: Arash Hosseinian Ahangarnejad, Canyon Country, CA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 47 days.

(21) Appl. No.: 18/679,582

(22) Filed: May 31, 2024

(65) Prior Publication Data

US 2025/0368257 A1     Dec. 4, 2025

(51) Int. Cl.
  *B62D 6/00*        (2006.01)
  *G01M 17/007*      (2006.01)

(52) U.S. Cl.
  CPC ........... *B62D 6/001* (2013.01); *G01M 17/007* (2013.01)

(58) Field of Classification Search
  CPC .............................. B62D 6/001; G01M 17/007
  USPC ........................................ 701/41, 42, 43, 44
  See application file for complete search history.

(56) References Cited

U.S. PATENT DOCUMENTS

| | | | | |
|---|---|---|---|---|
| 8,412,435 B2 * | 4/2013 | Maitlen | ............... | B60W 40/114 180/197 |
| 9,469,303 B2 * | 10/2016 | Czaja | ................... | B60W 40/13 |
| 11,453,405 B2 * | 9/2022 | Zhang | ................... | B60W 40/112 |
| 12,330,638 B2 * | 6/2025 | Kvieska | ............... | B62D 15/025 |
| 12,397,726 B2 * | 8/2025 | Armiyoon | ........... | B60R 16/0231 |
| 2009/0177346 A1 * | 7/2009 | Hac | ........................ | B60W 40/13 701/31.4 |
| 2024/0182043 A1 * | 6/2024 | Ahangarnejad | ....... | B60W 40/13 |

OTHER PUBLICATIONS

J. Kim, H. Lee, and S. Choi, "A robust road bank angle estimation based on a proportional-integral H8filter," Proc. Inst. Mech. Eng. D, J. Autom. Eng., vol. 226, No. 6, pp. 779-794, Jun. 2012.

R. Ghandour, A. Victorino, M. Doumiati, and A. Charara, "Tire/road friction coefficient estimation applied to road safety," in Proc. 18th Mediterranean Conf. Control Autom. Congr., 2010, pp. 1485-1490.

(Continued)

*Primary Examiner* — Hai H Huynh
(74) *Attorney, Agent, or Firm* — Dickinson Wright PLLC

(57) ABSTRACT

A method for estimating axle lateral forces includes setting an initial front axle lateral force value and an initial rear axle lateral force value, receiving sensor data from at least one sensor, and receiving at least one estimated mass property value. The method also includes determining, based on the sensor data, whether at least one vehicle parameter is within a range, and, in response to a determination that the at least one vehicle parameter is within the range, updating the at least one estimated mass property value. The method also includes estimating at least one of a front axle lateral force value and a rear axle lateral force value based on the updated at least one estimated mass property value and at least one of the initial front axle lateral force value and the initial rear axle lateral force value.

20 Claims, 4 Drawing Sheets

(56) References Cited

OTHER PUBLICATIONS

Ahangarnejad, A. H., Baslamisli, S. C. (2016). Adap-tyre: DEKF filtering for vehicle state estimation based on tyre parameter adaptation. International Journal of Vehicle Design, 71(1-4), 52-74.

Baffet, G., Charara, A., Stephant, J. (Oct. 2006). Sideslip angle, lateral tire force and road friction estimation in simulations and experiments. In 2006 IEEE Conference on Computer Aided Control System Design, 2006 IEEE International Conference on Control Applications, 2006 IEEE International Symposium on Intelligent Control (pp. 903-908). IEEE.

H. B. Pacejka, Tyre and Vehicle Dynamics. Oxford, U.K.: Butterworth-Heinemann, 2002.

W. Cho, J. Yoon, S. Yim, B. Koo, and K. Yi, "Estimation of tire forces for application to vehicle stability control," IEEE Trans. Veh. Technol., vol. 59, No. 2, pp. 638-649, Feb. 2010.

M. Doumiati, A. Victorino, D. Lechner, G. Baffet, and A. Charara, "Observers for vehicle tyre/road forces estimation: Experimental validation," Veh. Syst. Dyn., vol. 48, No. 11, pp. 1345-1378, Nov. 2010.

S. Antonov, A. Fehn, and A. Kugi, "Unscented Kalman filter for vehicle state estimation," Veh. Syst. Dyn., vol. 49, No. 9, pp. 1497-1520, Sep. 2011.

J. Stephant, A. Charara, and D. Meizel, "Virtual sensor: Application to vehicle sideslip angle and transversal forces," IEEE Trans. Ind. Electron., vol. 51, No. 2, pp. 278-289, Apr. 2004.

A. Vahidi, A. Stefanopoulou, and H. Peng, "Experiments for online estimation of heavy vehicles mass and time-varying road grade," in Proc. ASME IMECE, 2003, pp. 451-458.

H. K. Fathy, D. Kang, and J. L. Stein, "Online vehicle mass estimation using recursive least squares and supervisory data extraction," in Proc. ASME IMECE, 2003, pp. 451-458.

\* cited by examiner

SYSTEMS AND METHODS FOR FRONT AXLE AND REAR AXLE LATERAL FORCE ESTIMATION

TECHNICAL FIELD

This disclosure related to vehicle control systems, and in particular to systems and methods for estimating front axle and rear axle lateral force for use in vehicle control.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

SUMMARY

This disclosure relates generally to steering systems.

An aspect of the disclosed embodiments includes a method for estimating axle lateral forces. The method includes setting an initial front axle lateral force value and an initial rear axle lateral force value, receiving sensor data from at least one sensor, and receiving at least one estimated mass property value. The method also includes determining, based on the sensor data, whether at least one vehicle parameter is within a range, and, in response to a determination that the at least one vehicle parameter is within the range, updating the at least one estimated mass property value. The method also includes estimating at least one of a front axle lateral force value and a rear axle lateral force value based on the updated at least one estimated mass property value and at least one of the initial front axle lateral force value and the initial rear axle lateral force value.

Another aspect of the disclosed embodiments includes a system for estimating axle lateral forces. The system includes a processor, and a memory. The memory includes instructions that, when executed by the processor, cause the processor to: set an initial front axle lateral force value and an initial rear axle lateral force value; receive sensor data from at least one sensor; receive at least one estimated mass property value; determine, based on the sensor data, whether at least one vehicle parameter is within a range; in response to a determination that the at least one vehicle parameter is within the range, update the at least one estimated mass property value; and estimate at least one of a front axle lateral force value and a rear axle lateral force value based on the updated at least one estimated mass property value and at least one of the initial front axle lateral force value and the initial rear axle lateral force value.

Another aspect of the disclosed embodiments includes an apparatus for estimating axle lateral forces. The apparatus includes a controller associated with a vehicle, the controller being configured to: set an initial front axle lateral force value and an initial rear axle lateral force value; receive sensor data from at least one sensor; receive at least one estimated mass property value; determine, based on the sensor data, whether at least one vehicle parameter is within a range; in response to a determination that the at least one vehicle parameter is within the range, wherein the at least one vehicle parameter includes at least a longitudinal acceleration: update the at least one estimated mass property value; and estimate at least one of a front axle lateral force value and a rear axle lateral force value based on the updated at least one estimated mass property value and at least one of the initial front axle lateral force value and the initial rear axle lateral force value; and, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
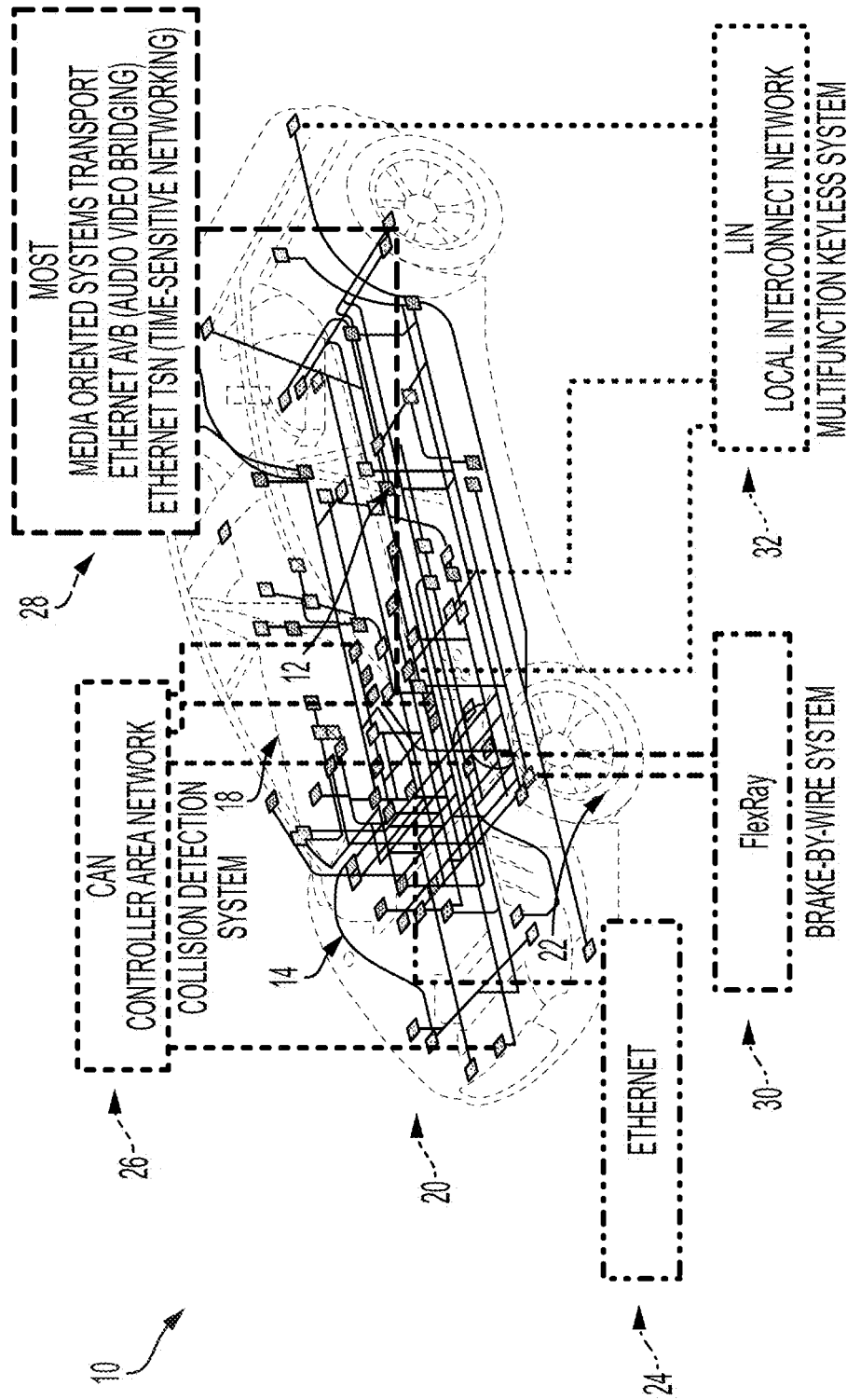
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an EPS system, a SbW steering system, a hydraulic steering system, or other suitable steering system. The steering system typically includes one or more controllers that control various aspects of the steering system including, but not limited to, controlling one or more electric motors and/or one or more actuators of the steering system.

Additionally, such vehicles typically include chassis control systems, in additional an EPS system, such as electronic stability controls (ESC), torque vectoring system (TVS), active front and/or rear steering, and active differential control. Such systems are typically used to improve vehicle stability and handling performance.

However, effectiveness of such control systems depends on the accuracy of tire lateral force measurement and/or estimation, which may be further improved by estimating and/or measuring tire lateral forces with high accuracy in real-time. Direct measurement of these forces is not feasible in vehicles due to high costs (e.g., leaving estimation of tire lateral forces as a typical option).

Increasingly, studies have been performed on the estimation of vehicle tire lateral forces using various tire models such as linear, Dugoff's model, rational tire model, Burckhardt tire model, or Pacejka's tire model. Such tire models include different parameters that may be tuned using experimental data. These parameters, however, change with the use or age of one or more tires of the vehicle. Further, such approaches are sensitive to changes in vehicle parameters such as vehicle mass, location of CG, road conditions, speed, and/or the like.

Accordingly, systems and methods, such as those described herein, configured to provide an improved estimate front axle and/or rear axle lateral force, may be desirable. In some embodiments, the systems and methods described herein may be configured to provide improved front axle and/or rear axle lateral force estimation that is robust to all aforementioned parameters. The systems and methods described herein may be configured to estimate front axle and rear axle lateral forces with high accuracy, even with low excitation. The systems and methods described herein may be configured to estimate front axle and/or rear axle lateral force without using a tire model. The systems and methods described herein may be configured to estimate the front axle and/or rear axle lateral force using vehicle on board sensors and mass property identification.

The systems and methods described herein may be configured to estimate the front axle and/or rear axle lateral forces during cornering maneuvers on different road conditions and/or during acceleration and/or braking, based on vehicle mass property estimation.

In some embodiments, the systems and methods described herein may be configured to use a recursive least square (RLS) method that uses vehicle onboard sensors and vehicle mass property identification. The systems and methods described herein may be configured to identify the vehicle mass properties using any suitable technique, such as those described in U.S. patent application Ser. No. 18/075,595, SYSTEMS AND METHODS FOR ONBOARD VEHICLE CENTER OF GRAVITY AND MOMENT OF INERTIA ESTIMATION, (filed Dec. 6, 2022) the entirety of the contents of which are incorporated by reference herein. The systems and methods described herein may be configured to provide front axle and/or rear axle lateral force estimation that is robust to various road conditions, speed, and/or mass variations.

In some embodiments, the systems and methods described herein may be configured to provide a relatively highly accurate estimation of front axle and/or rear axle lateral force that robust to different road conditions, robust to vehicle mass variations, robust at low excitation when speed relatively low, robot during acceleration and/or braking, and/or does not use a tire model.

In some embodiments, the systems and methods described herein may be configured to provide axle lateral force estimation. The systems and methods described herein may be configured to set an initial front axle lateral force value and an initial rear axle lateral force value. The systems and methods described herein may be configured to receive sensor data from at least one sensor. The sensor data may include at least one of longitudinal acceleration data, lateral acceleration data, and yaw rate data. The sensor data is received via a controller area network bus. The systems and methods described herein may be configured to receive at least one estimated mass property value. The at least one estimated mass property value may include at least one of a total mass of the vehicle, a center of gravity of the vehicle, and a moment of inertia of the vehicle.

The systems and methods described herein may be configured to determine, based on the sensor data, whether at least one vehicle parameter is within a range. The at least one vehicle parameter may include a longitudinal acceleration, or other suitable vehicle parameter. The systems and methods described herein may be configured to, in response to a determination that the at least one vehicle parameter is within the range, update the at least one estimated mass property value. The systems and methods described herein may be configured to estimate at least one of a front axle lateral force value and a rear axle lateral force value based on the updated at least one estimated mass property value and at least one of the initial front axle lateral force value and the initial rear axle lateral force value.

The systems and methods described herein may be configured to, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

The systems and methods described herein may be configured to estimate the at least one of the front axle lateral force value and the rear axle lateral force value by applying an RLS function to at least the at least one of the initial front axle lateral force value and the initial rear axle lateral force value.

The systems and methods described herein may be configured to control at least one aspect of a vehicle, which may include at least one aspect of a steering system of the vehicle or other suitable aspect of the vehicle, based on the at least one of the front axle lateral force value and the rear axle lateral force value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
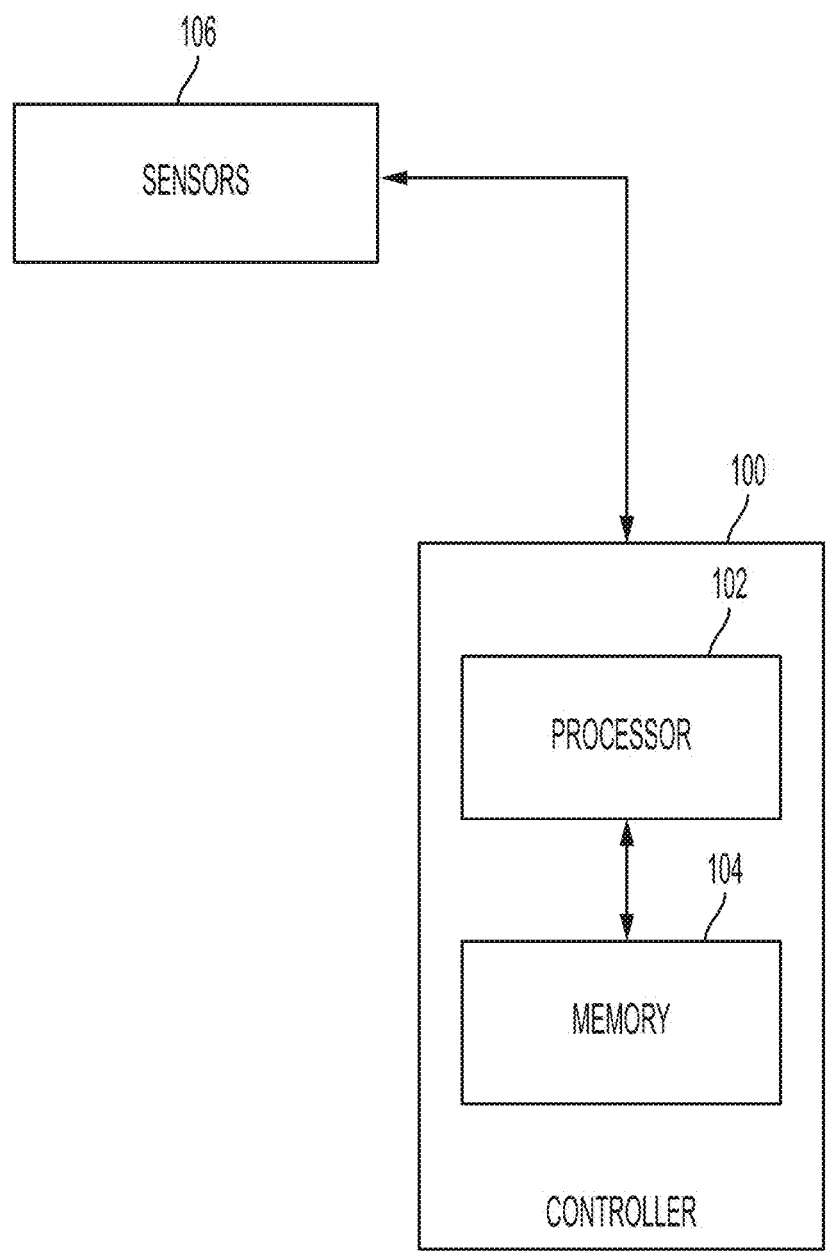
FIG. 2 generally illustrates a controller according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiment, the controller 100 may be configured to provide axle lateral force estimation. For example, the controller 100 may set an initial front axle lateral force value and an initial rear axle lateral force value. The controller 100 may receive sensor data from at least one sensor, such as at least one sensor 106 or other suitable sensor of the vehicle 10. The sensor data may include at least one of longitudinal acceleration data, lateral acceleration data, and yaw rate data associated with the vehicle 10. The sensor data is received via the CAN bus of the vehicle 10 or via any suitable technique or mechanism.

The controller 100 may receive at least one estimated mass property value. The at least one estimated mass property value may include at least one of a total mass of the vehicle 10, a center of gravity of the vehicle 10, and a moment of inertia of the vehicle 10.

The controller 100 may determine, based on the sensor data, whether at least one vehicle parameter is within a range. The at least one vehicle parameter may include a longitudinal acceleration, or other suitable vehicle parameter. The controller 100 may, in response to a determination that the at least one vehicle parameter is within the range, update the at least one estimated mass property value. The controller 100 may estimate at least one of a front axle lateral force value and a rear axle lateral force value based on the updated at least one estimated mass property value and at least one of the initial front axle lateral force value and the initial rear axle lateral force value.

The controller 100 may, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

The controller 100 may estimate the at least one of the front axle lateral force value and the rear axle lateral force value by applying an RLS function to at least the at least one of the initial front axle lateral force value and the initial rear axle lateral force value.

The controller 100 may control at least one aspect of the vehicle 10, which may include at least one aspect of a steering system of the vehicle 10 or other suitable aspect of the vehicle 10, based on the at least one of the front axle lateral force value and the rear axle lateral force value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 3:
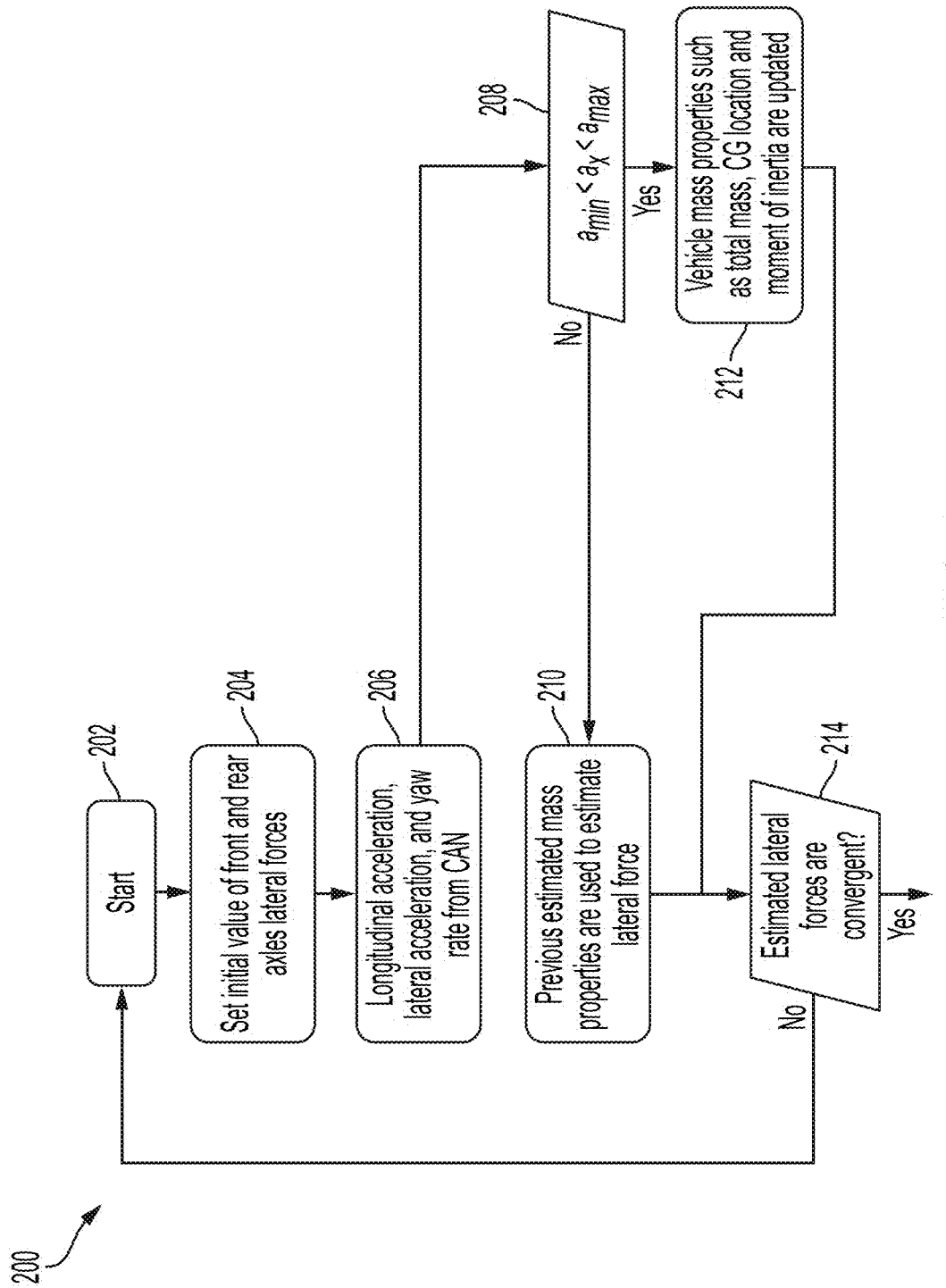
FIG. 3 is a flow diagram generally illustrating an axle lateral force estimation method according to the principles of the present disclosure.

FIG. 3 is a flow diagram generally illustrating an axle lateral force estimation method 200 according to the principles of the present disclosure. At 202, the method 200 begins.

At 204, the method 200 sets an initial value of the front axle and the rear axle lateral forces. The method 200 may model vehicle lateral dynamics according to:

$$\begin{cases} m_{est} a_y = F_{yf} + F_{yr} \\ I_{z_{est}} \dot{r} = l_{fest} F_{yf} - l_{rest} F_{yr} \end{cases}$$

$$\begin{bmatrix} a_y \\ \dot{r} \end{bmatrix} = \begin{bmatrix} \dfrac{1}{m} & \dfrac{1}{m} \\ \dfrac{l_f}{I_2} & -\dfrac{l_r}{I_2} \end{bmatrix} \begin{bmatrix} F_{yf} \\ F_{yr} \end{bmatrix}$$

At 206, the method 200 receives longitudinal acceleration data, lateral acceleration data, and yaw rate data from the CAN bus.

At 208, the method 200 determines whether the longitudinal acceleration indicated by the longitudinal acceleration data is within a range. If the longitudinal acceleration is within the range, the method 200 continues at 212. Alternatively, if the longitudinal acceleration is not within the range, the method 200 continues at 210.

At 210, the method 200 sets estimated mass properties for the vehicle 10 to a previously estimated set of mass properties.

At 212, the method 200 updates the estimated vehicle mass properties. The vehicle mass properties may include a total mass of the vehicle, a center of gravity of the vehicle (CG), and/or a moment of inertia of the vehicle.

At 214, the method 200 estimates the front axle lateral force and/or the real axle lateral force using the RLS function based on the estimated vehicle mass properties (e.g., from 210 or 212). The method 200 may determine whether the estimated lateral forces are convergent. If the lateral forces are not convergent, the method 200 continues at 202. Alternatively, if the lateral forces are convergent, the method 200 ends.

Figure 4:
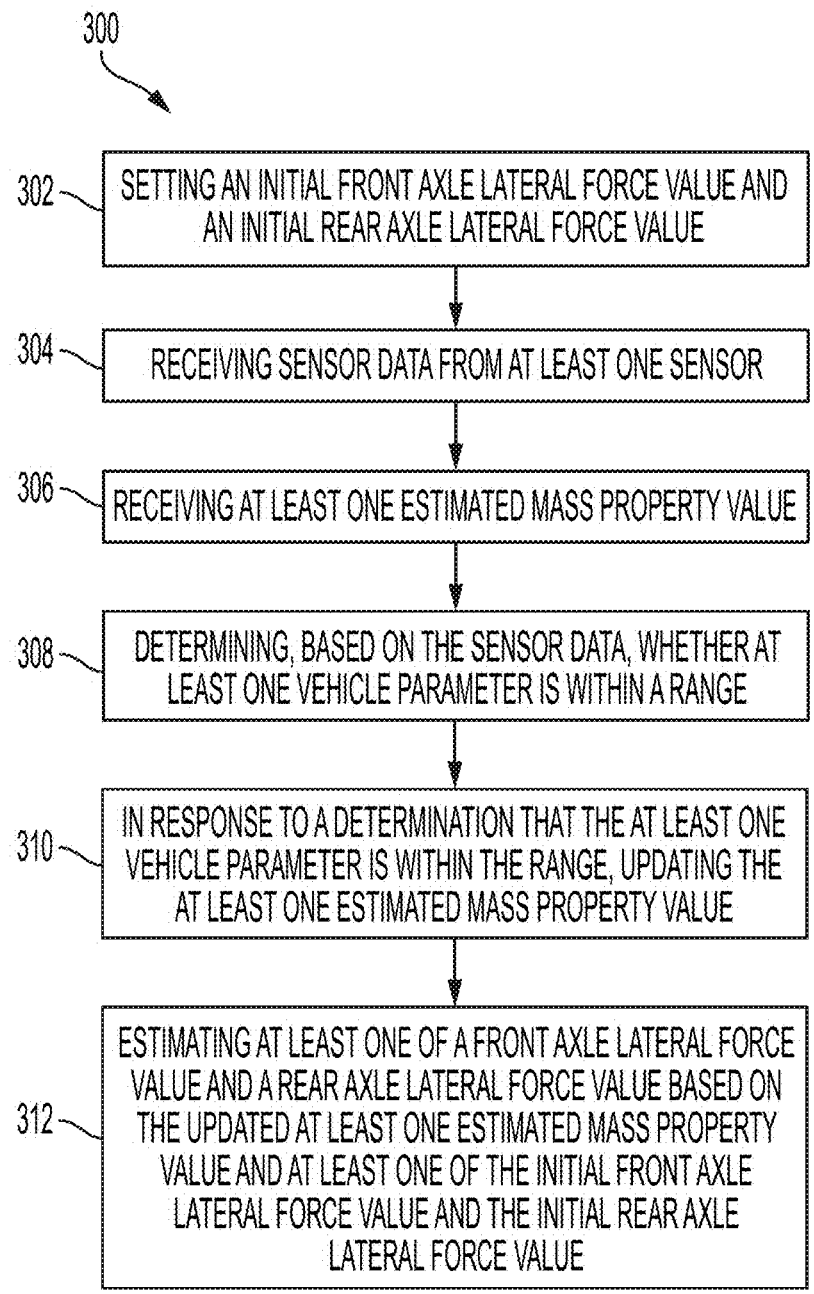
FIG. 4 is a flow diagram generally illustrating an alternative axle lateral force estimation method according to the principles of the present disclosure.

FIG. 4 is a flow diagram generally illustrating an alternative axle lateral force estimation method 300 according to the principles of the present disclosure. At 302, the method 300 sets an initial front axle lateral force value and an initial rear axle lateral force value.

At 304, the method 300 receives sensor data from at least one sensor.

At 306, the method 300 receives at least one estimated mass property value.

At 308, the method 300 determines, based on the sensor data, whether at least one vehicle parameter is within a range.

At 310, the method 300, in response to a determination that the at least one vehicle parameter is within the range, updates the at least one estimated mass property value.

At 312, the method 300 estimates at least one of a front axle lateral force value and a rear axle lateral force value based on the updated at least one estimated mass property value and at least one of the initial front axle lateral force value and the initial rear axle lateral force value.

Alternatively, the method 300, in response to a determination that the at least one vehicle parameter is not within the range, estimates at least one of the front axle lateral force value and the rear axle lateral force value based on the previously estimated at least one estimated mass property value and at least one of the initial front axle lateral force value and the initial rear axle lateral force value.

The method 300 may estimate the at least one of the front axle lateral force value and the rear axle lateral force value using the RLS function. The method 300 may control at least one aspect of the vehicle 10 based on the at least one of the front axle lateral force value and the rear axle lateral force value.

In some embodiments, a method for estimating axle lateral forces includes setting an initial front axle lateral force value and an initial rear axle lateral force value, receiving sensor data from at least one sensor, and receiving at least one estimated mass property value. The method also includes determining, based on the sensor data, whether at least one vehicle parameter is within a range, and, in response to a determination that the at least one vehicle parameter is within the range, updating the at least one estimated mass property value. The method also includes estimating at least one of a front axle lateral force value and a rear axle lateral force value based on the updated at least one estimated mass property value and at least one of the initial front axle lateral force value and the initial rear axle lateral force value.

In some embodiments, the method also includes controlling at least one aspect of a vehicle based on the at least one of the front axle lateral force value and the rear axle lateral force value. In some embodiments, the at least one aspect of the vehicle includes at least one aspect of a steering system of the vehicle. In some embodiments, the method also includes, in response to a determination that the at least one vehicle parameter is not within the range, estimating the at least one of a front axle lateral force value and the rear axle lateral force value based on the at least one estimated mass property value and at least one of the initial front axle lateral force value and the initial rear axle lateral force value. In some embodiments, estimating the at least one of the front axle lateral force value and the rear axle lateral force value includes applying a recursive least square function to at least the at least one of the initial front axle lateral force value and the initial rear axle lateral force value. In some embodiments, the sensor data includes at least one of longitudinal acceleration data, lateral acceleration data, and yaw rate data. In some embodiments, the sensor data is received via a controller area network bus. In some embodiments, the at least one vehicle parameter includes longitudinal acceleration. In some embodiments, the at least one estimated mass property value includes at least one of a total mass of a vehicle, a center of gravity of the vehicle, and a moment of inertia of the vehicle.

In some embodiments, a system for estimating axle lateral forces includes a processor, and a memory. The memory includes instructions that, when executed by the processor, cause the processor to: set an initial front axle lateral force value and an initial rear axle lateral force value; receive sensor data from at least one sensor; receive at least one estimated mass property value; determine, based on the sensor data, whether at least one vehicle parameter is within a range; in response to a determination that the at least one vehicle parameter is within the range, update the at least one estimated mass property value; and estimate at least one of a front axle lateral force value and a rear axle lateral force value based on the updated at least one estimated mass property value and at least one of the initial front axle lateral force value and the initial rear axle lateral force value.

In some embodiments, the instructions further cause the processor to control at least one aspect of a vehicle based on the at least one of the front axle lateral force value and the rear axle lateral force value. In some embodiments, the at least one aspect of the vehicle includes at least one aspect of a steering system of the vehicle. In some embodiments, the instructions further cause the processor to, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value. In some embodiments, estimating the at least one of the front axle lateral force value and the rear axle lateral force value includes applying a recursive least square function to at least the at least one of the initial front axle lateral force value and the initial rear axle lateral force value. In some embodiments, the sensor data includes at least one of longitudinal acceleration data, lateral acceleration data, and yaw rate data. In some embodiments, the sensor data is received via a controller area network bus. In some embodiments, the at least one vehicle parameter includes longitudinal acceleration. In some embodiments, the at least one estimated mass property value includes at least one of a total mass of a vehicle, a center of gravity of the vehicle, and a moment of inertia of the vehicle.

In some embodiments, an apparatus for estimating axle lateral forces includes a controller associated with a vehicle, the controller being configured to: set an initial front axle lateral force value and an initial rear axle lateral force value; receive sensor data from at least one sensor; receive at least one estimated mass property value; determine, based on the sensor data, whether at least one vehicle parameter is within a range; in response to a determination that the at least one vehicle parameter is within the range, wherein the at least one vehicle parameter includes at least a longitudinal acceleration: update the at least one estimated mass property value; and estimate at least one of a front axle lateral force value and a rear axle lateral force value based on the updated at least one estimated mass property value and at least one of the initial front axle lateral force value and the initial rear axle lateral force value; and, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

In some embodiments, the controller is further configured to control at least one aspect of a vehicle based on the at least one of the front axle lateral force value and the rear axle lateral force value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for estimating axle lateral forces, the method comprising:
    setting an initial front axle lateral force value and an initial rear axle lateral force value;
    receiving sensor data from at least one sensor;
    receiving at least one estimated mass property value;
    determining, based on the sensor data, whether at least one vehicle parameter is within a range;
    in response to a determination that the at least one vehicle parameter is within the range, updating the at least one estimated mass property value; and
    estimating at least one of a front axle lateral force value and a rear axle lateral force value based on the updated at least one estimated mass property value and at least one of the initial front axle lateral force value and the initial rear axle lateral force value.

2. The method of claim 1, further comprising controlling at least one aspect of a vehicle based on the at least one of the front axle lateral force value and the rear axle lateral force value.

3. The method of claim 2, wherein the at least one aspect of the vehicle includes at least one aspect of a steering system of the vehicle.

4. The method of claim 1, further comprising, in response to a determination that the at least one vehicle parameter is not within the range, estimating the at least one of a front axle lateral force value and the rear axle lateral force value based on the at least one estimated mass property value and at least one of the initial front axle lateral force value and the initial rear axle lateral force value.

5. The method of claim 1, wherein estimating the at least one of the front axle lateral force value and the rear axle lateral force value includes applying a recursive least square function to at least the at least one of the initial front axle lateral force value and the initial rear axle lateral force value.

6. The method of claim 1, wherein the sensor data includes at least one of longitudinal acceleration data, lateral acceleration data, and yaw rate data.

7. The method of claim 1, wherein the sensor data is received via a controller area network bus.

8. The method of claim 1, wherein the at least one vehicle parameter includes longitudinal acceleration.

9. The method of claim 1, wherein the at least one estimated mass property value includes at least one of a total mass of a vehicle, a center of gravity of the vehicle, and a moment of inertia of the vehicle.

10. A system for estimating axle lateral forces, the system comprising:
    a processor; and
    a memory including instructions that, when executed by the processor, cause the processor to:
        set an initial front axle lateral force value and an initial rear axle lateral force value;
        receive sensor data from at least one sensor;
        receive at least one estimated mass property value;
        determine, based on the sensor data, whether at least one vehicle parameter is within a range;
        in response to a determination that the at least one vehicle parameter is within the range, update the at least one estimated mass property value; and
        estimate at least one of a front axle lateral force value and a rear axle lateral force value based on the updated at least one estimated mass property value and at least one of the initial front axle lateral force value and the initial rear axle lateral force value.

11. The system of claim 10, wherein the instructions further cause the processor to control at least one aspect of a vehicle based on the at least one of the front axle lateral force value and the rear axle lateral force value.

12. The system of claim 11, wherein the at least one aspect of the vehicle includes at least one aspect of a steering system of the vehicle.

13. The system of claim 10, wherein the instructions further cause the processor to, in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

14. The system of claim 10, wherein estimating the at least one of the front axle lateral force value and the rear axle lateral force value includes applying a recursive least square function to at least the at least one of the initial front axle lateral force value and the initial rear axle lateral force value.

15. The system of claim 10, wherein the sensor data includes at least one of longitudinal acceleration data, lateral acceleration data, and yaw rate data.

16. The system of claim 10, wherein the sensor data is received via a controller area network bus.

17. The system of claim 10, wherein the at least one vehicle parameter includes longitudinal acceleration.

18. The system of claim 10, wherein the at least one estimated mass property value includes at least one of a total mass of a vehicle, a center of gravity of the vehicle, and a moment of inertia of the vehicle.

19. An apparatus for estimating axle lateral forces, the apparatus comprising:
a controller associated with a vehicle, the controller being configured to:
set an initial front axle lateral force value and an initial rear axle lateral force value;
receive sensor data from at least one sensor;
receive at least one estimated mass property value;
determine, based on the sensor data, whether at least one vehicle parameter is within a range;
in response to a determination that the at least one vehicle parameter is within the range, wherein the at least one vehicle parameter includes at least a longitudinal acceleration:
update the at least one estimated mass property value; and
estimate at least one of a front axle lateral force value and a rear axle lateral force value based on the updated at least one estimated mass property value and at least one of the initial front axle lateral force value and the initial rear axle lateral force value; and
in response to a determination that the at least one vehicle parameter is not within the range, estimate the at least one of a front axle lateral force value and the rear axle lateral force value based on the at least one estimated mass property value and at least one of the initial front axle lateral force value and the initial rear axle lateral force value.

20. The apparatus of claim 19, wherein the controller is further configured to control at least one aspect of a vehicle based on the at least one of the front axle lateral force value and the rear axle lateral force value.

* * * * *